United States Patent

[11] 3,620,905

[72] Inventor Leo Ahramjian
 Wilmington, Del.
[21] Appl. No. 868,235
[22] Filed Oct. 21, 1969
[45] Patented Nov. 16, 1971
[73] Assignee E. I. du Pont de Nemours and Company
 Wilmington, Del.

[54] OPTICALLY CLEAR THERMOPLASTIC POLYURETHANES
11 Claims, No Drawings

[52] U.S. Cl. ................................................. 161/190,
 260/75 NP, 260/75 NT, 260/77.5 AM, 260/77.5 AT
[51] Int. Cl. ...................................................... B32b 17/10
[50] Field of Search ........................................... 161/190;
 260/75 NT, 75 NP, 77.5 AT, 77.5 AM

[56] References Cited
UNITED STATES PATENTS
2,929,800 3/1960 Hill ................................ 260/77.5

3,015,650 1/1962 Schollenberger .............. 260/75
3,388,032 6/1968 Saunders ....................... 161/190

Primary Examiner—Donald E. Czaja
Assistant Examiner—Eugene C. Rzucidlo
Attorney—Vernon R. Rice ABSTRACT: Colorless, optically clear, thermoplastic polyurethanes prepared from diisocyanato-dicyclohexylmethane containing 10–100 percent trans-trans 4,4'-methylenebis(cyclohexyl isocyanate) (PICM), a polyether or polyester glycol having a molecular weight of 500–3,000 and a diol having a molecular weight below 250. The low molecular weight diol is reinforcing when the isocyanate contains 30 percent or less trans-trans PICM and nonreinforcing when the isocyanate contains greater than 30 percent trans-trans PICM. The polyurethanes are particularly suitable for use in laminates for safety and bullet-proof glass.

OPTICALLY CLEAR THERMOPLASTIC POLYURETHANES

BACKGROUND OF THE INVENTION

Thermoplastic polyurethanes have been suggested for preparing conventional laminated safety glass and more complex laminates such as those disclosed in U.S. Pat. No. 3,388,032 to Saunders. Thermoplastic polyurethanes based on aromatic diisocyanates often are slightly colored at the time of preparation and usually develop color to a limited degree on aging. These polyurethanes are, however, acceptable for preparing conventional laminated safety glass because the interlayer of polyurethane is relatively thin in such structures and is protected from extensive discoloration by the glass.

In other applications such as the laminates of U.S. Pat. No. 3,388,032 and in special glass-polyurethane-plastic laminates designed to resist penetration by projectiles, the polyurethane is frequently employed in much thicker layers, and optical clarity, minimum initial color and substantially complete freedom from discoloration on aging become more critical. At the same time, it is desirable that the thermoplastic polyurethanes have physical properties which permit them to absorb a large amount of energy when their laminates are subjected to impact.

Though polyurethanes have been suggested for use in special laminates as those described above, none are known which adequately combine the properties of impact resistance, optical clarity and substantial colorlessness.

SUMMARY OF THE INVENTION

A substantially colorless, optically clear, thermoplastic polyurethane prepared by reacting (A) 1.0 mole of a high molecular weight polyether glycol or a polyester glycol melting below about 40° C. and having a molecular weight M, where M is about 500–3,000, (B) about 0.6M/1000–3.5M/1000 moles of a diol having a molecular weight less than 250, and (C) diisocyanato-dicyclohexylmethane containing 10–100 percent of the *trans-trans* isomer of 4,4'-methylenebis(cyclohexyl isocyanate) in an amount substantially equivalent to the equivalents of (A) plus (B); with the proviso that a reinforcing diol be used as the low molecular weight diol when the diisocyanate contains not more than 30 percent *trans-trans* isomer and a nonreinforcing diol be used when the diisocyanate contains more than 30 percent *trans-trans* isomer.

DETAILED DESCRIPTION

High molecular weight glycols which are used to prepare the compositions of this invention include polyoxyalkylene ether glycols and polyester glycols. The glycols should have a melting point below about 40° C. and have number average molecular weights of about 500–3,000. Glycols having molecular weights of about 600–2,000 are especially effective in giving high quality polyurethanes. Illustrative of suitable polyoxyalkylene ether glycols are poly-1,2-propylene ether glycol, poly-1,3-propylene ether glycol and polytetramethylene ether glycol, the latter being especially preferred. Polyoxyalkylene ether glycols can be prepared by condensing epoxides or other cyclic ethers as is well known in the art.

Suitable polyesters include polycaprolactones and polyesters based on dicarboxylic acids, such as adipic, succinic and sebacic acids, and low molecular weight glycols such as ethylene glycol, propylene glycol, diethylene glycol, 1,4-butanediol and 1,6-hexanediol. The polycaprolactones are prepared by condensing caprolactone in the presence of minor amounts of difunctional active hydrogen compounds such as water or a low molecular weight glycol. Polyesters based on dicarboxylic acids and glycols can be derived by well-known esterification or trans-esterification procedures. Polyesters based on mixtures of glycols and/or mixtures of diacids are often useful because they generally melt below 40° C. in the molecular weight range of interest.

The isocyanates used in the preparation of the compositions of this invention are diisocyanato-dicyclohexylmethanes containing from about 10–100 percent of the *trans-trans* isomer of 4,4'-methylenebis(cyclohexyl isocyanate), also hereinafter referred to as "PICM." Other components usually present in the mixtures of position and/or stereoisomers of the diisocyanato-dicyclohexylmethane used in this invention are the *cis-trans* and *cis-cis* isomers of PICM and stereoisomers of 2,4'-methylenebis-(cyclohexyl isocyanate). These, as well as the *trans-trans* PICM isomer, are present in amounts which can be controlled by the procedures used to prepare the diisocyanato-dicyclohexylmethane. Preferred diisocyanates are isomeric PICM mixtures which are liquid at 25° C. or less. Such liquid PICM's contain less than about 26 percent *trans-trans* isomer and less than about 72 percent *cis-cis* isomer. An especially preferred mixture contains the *trans-trans*, *cis-trans* and *cis-cis* isomers of PICM in a weight ratio of about 20:65:15 and optionally small amounts up to about 5 percent by weight of 2,4'-methylenebis(cyclohexyl isocyanate). These preferred mixtures can be conveniently handled and give high-quality polyurethanes.

The PICM used in this invention is prepared by phosgenating the corresponding 4,4'-methylenebis(cyclohexyl amine) (PACM) by procedures well known in the art, of U.S. Pat. Nos. 2,644,007, 2,680,127 and 2,908,703. The PACM isomer mixtures which upon phosgenation yield PICM that is a liquid at room temperature are also well known in the art, and can be obtained by hydrogenation of methylenedianiline under mild conditions and/or by fractional crystallization of PACM isomer mixtures in the presence of water and alcohols.

The low molecular weight diols used in this invention have molecular weights below 250 and have only primary and secondary aliphatic hydroxyl groups. While the diols have only aliphatic hydroxyl groups, diols containing aromatic rings such as 1,4-di($\beta$-hydroxyethoxy) benzene, are included.

In preparing the polyurethanes of this invention, it is important that reinforcing diols be used with diisocyanate mixtures low in *trans-trans* PICM content, and nonreinforcing diols be used in mixtures with high *trans-trans* PICM content. Normally, reinforcing diols are required when the *trans-trans* PICM content of the diisocyanate mixture is 30 percent or less and non reinforcing diols are required when the *trans-trans* PICM content exceeds 30 percent.

Reinforcing diols have one or more of the following characteristics: (a) a high degree of symmetry, (b) a relatively low molecular weight ($C_6$ or less exclusive of aromatic radicals which may be present). Diols containing aromatic nucleii are frequently reinforcing. Nonreinforcing diols have one or more of the following characteristics: (a) higher molecular weights than reinforcing glycols, but still below 250, ($C_7$ and higher exclusive of aromatic radicals), (b) free of aromatic nucleii. Illustrative reinforcing diols include 1,4-butanediol, ethylene glycol, 1,2-propanediol, 1,3-propanediol, neopentyl glycol, *cis* or *trans*1,4-dihydroxycyclohexane and 1,4-di($\beta$-hydroxyethoxy) benzene. Illustrative nonreinforcing diols include 1,3-butanediol, 2-methyl-2-ethyl-1,3-propanediol, 2-methylbutanediol-1,4, 2-butyl-2-ethylpropanediol-1,3 and 2-allyloxymethyl-2-methylpropanediol-1,3.

The more of the characteristics within each class of reinforcing or nonreinforcing which a diol has, the greater the tendency of that diol to be reinforcing or nonreinforcing as the case may be. Thus, 1,4-butanediol and ethylene glycol are highly reinforcing diols whereas 1,3-butanediol and 2-methyl-2-ethyl-1,3-propanediol are strongly nonreinforcing. Preferably, as the content of *trans-trans* PICM in the diisocyanate increases, one of the strongly nonreinforcing glycols is employed and when the *trans-trans* PICM content decreases, a strongly reinforcing diol is employed. The particular diol to be used with a given diisocyanato-dicylohexylmethane isomeric mixture, however, can easily be determined by one skilled in the art with reference to the general guidelines given above. If a highly reinforcing diol is used with an isocyanate mixture high in *trans-trans* PICM content, the resulting polyurethane will not have optical clarity. Further, if a nonreinforcing diol is used with an isocyanate mixture low in *trans-trans* PICM content, that is 30 percent or less, the resulting polyurethane will have optical clarity but poor physical properties.

The mole ratio of low molecular weight diol to high molecular weight glycol is important in preparing the polymers of this invention. This mole ratio is expressed as a function of the molecular weight (M) of the high molecular weight glycol because certain properties of the polymers, such as hardness, are related to the molecular weight distribution of the polymers derived from the diisocyanato-dicyclohexylmethane. The amount of low molecular weight diol used is about 0.6M/1000–3.5M/1000 moles. The isocyanate used is substantially equivalent to the equivalents of A+B.

The polymers of this invention can be prepared by one-shot, quasi-prepolymer or full prepolymer procedures, all of which are well known in the art. In the one-shot procedure the isocyanate, high molecular weight glycol and low molecular weight diol are mixed together and reacted simultaneously. In the full prepolymer procedure the isocyanate is reacted with the high molecular weight glycol to prepare an isocyanato-terminated prepolymer which is then reacted with the low molecular weight diol. In the quasi-prepolymer procedure the isocyanate is reacted with a portion of the high molecular weight glycol and in a subsequent step the low molecular weight diol and remaining part of the high molecular weight glycol are mixed with the prepolymer prepared in the first step. Systems using a high proportion of *trans-trans* PICM or using a proportion of *trans-trans* PICM approaching 30 percent with a highly reinforcing diol have a strong tendency to form hazy or opaque polymers.

To ensure optical clarity, it is important that the mixture of polymer-forming ingredients be heated promptly after mixing and before gelling has commenced and that a urethane forming catalyst be present in the mixture so that the reaction product gels within about one hour. Gelation has occurred if the product does not "string" when a glass rod is inserted and withdrawn from the material at a temperature of about 80–100° C. The temperature required will vary from about 50–210° C. depending on the amount of catalyst and the particular formulation used. In conventional casting processes, temperatures of about 50–150° C. are employed; while in the reaction extrusion process described hereinafter temperatures of about 150–210° C. are recommended.

Suitable urethane-forming catalysts are those highly specific for the formation of urethane by reaction of –NCO and –OH groups and which have little tendency to accelerate side reactions leading to allophonate and isocyanate formation. For these reasons, catalysts such as stannous slats of organic acids and organotin compounds are preferred. Illustrative catalysts include stannous octoate, stannous oleate, dibutyltin diacetate and dibutyltin dilaurate, the last named being especially preferred. The amount of catalyst to be used in a particular system can routinely be determined by one skilled in the art. The preferred dibutyltin dilaurate is usually employed in amounts of about 0.0005–0.02 part per 100 parts of the polymer-forming ingredients. The amount of catalyst needed depends on the curing temperature used. While the tin salt and organotin catalysts are preferred, other catalysts can be used.

The conditions described above that the reaction mixture be heated and that a catalyst be present become essential when preparing polymers having a relatively high hardness such as are obtained when: (a) the ratio of moles of low molecular weight diol to moles of polymeric glycol is about 2.5M/100–3.5M/1000, (b) a highly reinforcing diol is used with 4,4'-methylenebis(cyclohexyl isocyanate) containing 20–30 percent *trans-trans* isomer, or (c) the 4,4'-methylenebis(cyclohexyl isocyanate) used contains about 70–100 percent *trans-trans* isomer.

The polyurethanes of this invention are optically clear or transparent as opposed to translucent or opaque. They are colorless or substantially colorless ("substantially colorless" as used herein is meant to include colorless) and remain that way indefinitely. Moreover, the polymers are highly impact resistant and have excellent physical properties. They are particularly useful in making bullet-proof glass for automobiles and airplanes.

A particularly preferred method of preparing polyurethane interlayers of this invention is to introduce the reactants continuously to a reactor-extruder maintained at a temperature of about 140–210° C. and extrude the resulting polyurethane continuously in the form of a sheet. At these reaction temperatures, the catalyzed reaction occurs very rapidly, i.e., within about 5–15 minutes. This method can be used to prepare extruded sheet by one-shot, quasi- or full prepolymer techniques. In any case at least two streams, one rich in polyol; the mother in isocyanate, must be fed to the extruder unless all of the ingredients are premixed just before introduction. By adjusting the temperature catalyst concentration and throughput, conditions can be established for continuous production of sheet. Such a reaction-extrusion process provides sheeting with particularly high quality optical properties.

Polymers prepared from 1,4-butanediol, polytetramethyleneether glycol having a molecular weight of about 1,000 and 4,4'-methylenebis(cylohexyl isocyanate) containing about 20 percent *trans-trans* isomer, 65 percent *cis-trans* isomer and 15 percent *cis-cis* isomer PICM-20) have been found to be particularly useful in preparing transparent laminates with glass and/or plastic sheets for a variety of purposes. For automotive safety glass, polymers employing 2.0–3.1 moles of PICM-20 and 1.0–2.1 moles of butanediol per mole of polytetramethyleneether glycol are preferred. Safety glass for use in conventional aircraft where operating temperatures tend to be lower is preferably prepared from polymers having lower mole ratios of PICM-20 and butanediol to polytetramethyleneether glycol. For stopping high velocity projectiles, harder laminates containing higher mole ratios of PICM-20 (3.0–4.5 moles) and butanediol are preferred.

The invention will be further illustrated by the following examples wherein parts and percentages are by weight unless otherwise indicated.

The properties of the vulcanizates reported in the examples are measured substantially in accordance with the following ASTM procedures:

| Tensile Strength | D412 |
| Elongation at Break | D412 |
| Modulus | D412 |
| Set at Break | D412 |
| Resilience, Yerzley | D945 |
| Compression Set | D395 |
| Hardness, Shore A | D676 |
| Hardness, Shore D | D1484 |

A crosshead speed of 20 inches/minute is used in making the measurements by ASTM D412.

EXAMPLE 1

A. To a mixture of 26.2 parts of 4,4'-methylenebis(cyclohexyl isocyanate) containing about 20 percent *trans-trans* isomer, 65 percent *cis-trans* isomer and 15 percent *cis-cis* isomer, 49.2 parts polytetramethyleneether glycol having a number average molecular weight of 984 and 4.5 parts of 1,4-butanediol at room temperature is added 0.002 part of dibutyltin dilaurate. The mixture is agitated, warmed to 55° C. and degassed by reducing the pressure above it. The mixture is then poured into a mold heated to about 100° C. and cured for 16 hours at 100° C. It gels in less than 1 hour. After standing for 1 week at room temperature, the cured material is optically clear and colorless. It exhibits the following physical properties:

| 100% Modulus, p.s.i. | 600 |
| 300% Modulus, p.s.i. | 1,300 |
| Tensile at Break, p.s.i. | 3,000 |
| Elongation at Break, % | 490 |
| Set at Break, % | 4 |
| Resilience, Yerzley, % | 80 |

| | |
|---|---|
| Compression Set, Method B. %, 22 hrs./70° C. | 80 |
| Hardness, Shore A | 77 |

The material is thermoplastic and can be compression molded at about 150° C. It is readily soluble in tetrahydrofuran and similar solvents. Exposure of this material for 100 hours in a Fade-Ometer or Weather-Ometer (ASTM D750) or for 3 months in Florida (sample facing south, inclined at 45° C.) does not cause discoloration.

An isocyanato-terminated prepolymer is prepared by reacting 49.2 parts of the polytetramethylene ether glycol of part A with 26.2 parts of the diisocyanate used in part A for 90 minutes at 80° C. in the presence of 0.001 part of dibutyltin dilaurate. The resulting prepolymer has an NCO group assay of 5.43 percent by weight. To 75.4 parts of this prepolymer is added 4.34 parts of 1,4-butanediol and the mixture is warmed to 80° C., degassed by reducing the pressure above it and poured into a mold heated to about 100° C. The material is cured for 16 hours at 100° C. It gels in less than 1 hour. After standing for 1 week at room temperature, the cured material is optically clear and colorless. Its properties are substantially identical to those of the polymer prepared in part A.

EXAMPLE 2

A. To a mixture of 89.0 parts of the 4,4'-methylenebis(cyclohexyl isocyanate) described in example 1, 78.2 parts of polytetramethylene ether glycol having a number average molecular weight of 978 and 22.2 parts of 1,4-butanediol at room temperature is added 0.004 part of dibutyltin dilaurate. At room temperature this mixture is turbid. The mixture is agitated and warmed to 75° C. at which temperature it turns clear and reacts with sufficient rapidity to increase the temperature slightly. The mixture is degassed and poured into a mold heated to about 100° C. After curing for 2 hours at 100° C., the material is optically clear and colorless. The material is thermoplastic and can be compression molded at about 150° C. A 0.4 millimeter film of the material, formed by compression molding at 150° C., exhibits the following properties:

| | |
|---|---|
| 100% Modulus, p.s.i. | 2,000 |
| 300% Modulus, p.s.i. | 6,500 |
| Tensile at Break, p.s.i. | 7,000 |
| Elongation at Break, % | 310 |
| Hardness, Shore A | 97 |
| Hardness, Shore D | 65 |

The polymer of this example, protected by the addition of 1 percent by weight of 4,4'-butylidenebis(6-t-butyl-m-cresol) during its preparation, does not exhibit any visible change after 700 hours in a Fade-Ometer or a Weather-ometer (ASTM D750) or after 6 months in Florida (sample facing south inclined at 45° C.).

When the above procedure is repeated with the exception that the quantity of dibutyltin dilaurate is reduced from 0.004 part to 0.002 part, an opaque product is obtained.

When the above procedure is repeated with the exception that curing is allowed to proceed at room temperature after the mixing step at about 75° C., an opaque product is obtained.

The latter two runs show the importance of adding a urethane-forming catalyst in sufficient quantities and heating to induce rapid gellation after the polymer-forming ingredients are mixed.

B. An isocyanato-terminated prepolymer is prepared by reacting 98.4 parts of polytetramethyleneether glycol having a number average molecular weight of 984 with 112.0 parts of the 4,4'-methylenebis(cyclohexyl isocyanate) described in example 1, for 90 minutes at 80° C. in the presence of 0.004 parts of dibutyltin dilaurate. To 100 parts of the resulting prepolymer (having an NCO assay of 13.0 percent) is added 13.5 parts of 1,4-butanediol. At about room temperature this mixture is cloudy. It is heated to about 75° C. where it becomes clear, is degassed and poured into a mold heated to about 100° C. The cast material is cured for 4 hours at 100° C. The physical properties and aging characteristics of this clear, colorless product are substantially the same as those for the cured polymer prepared in part A of this example.

EXAMPLE 3

A. A mixture of 26.2 parts of the 4,4'-methylenebis(cyclohexyl isocyanate) described in example 1, 66.6 parts of polytetramethyleneether glycol having a number average molecular weight of about 2,000, 5.66 parts of 1,4-butanediol and 0.01 part of dibutyltin dilaurate is heated to 75° C., degassed and poured into a mold heated to 100° C. The mold is placed in a 100° C. oven for 3 hours to cure the polymer. After cooling to room temperature, the polymer is colorless and optically clear. It has the following physical properties:

| | |
|---|---|
| 100% Modulus, p.s.i. | 650 |
| 300% Modulus, p.s.i. | 1,100 |
| Tensile at Break, p.s.i. | 6,000 |
| Elongation at Break, % | 600 |
| Hardness, Shore A | 83 |

B. The procedure of part A is repeated with the exception that a mixture of stereoisomers of 4,4'-methylenebis(cyclohexyl isocyanate) containing approximately 53 percent *trans-trans* isomer, 38 percent *cis-trans* isomer, 7 percent *cis-cis* isomer and 2 percent of 2,4'-methylenebis(cyclohexyl isocyanate) isomer is used. The resulting product is opaque and has a Shore A Hardness of 91. This run, which is outside the scope of the invention, shows the importance of using a nonreinforcing glycol when an isocyanate mixture containing greater than 30 percent *trans-trans* PICM is used.

EXAMPLE 4

A series of 17 polymers are prepared using the same procedure and a constant mole ratio of 4,4'-methylenebis(cyclohexyl isocyanate), polytetramethyleneether glycol and low molecular weight glycol. The polymers differ in that the *trans-trans* content of

| Trans-trans content of diisocyanate, percent | Low molecular weight glycol | Cured polymer appearance | Hardness, Shore A |
|---|---|---|---|
| 20 | 1,3-butanediol | Clear [1] | 80 |
| | 1,4-butanediol | do | 87 |
| | Ethylene glycol | Hazy | 93 |
| | 1,2-propanediol | Opaque [2] | 96 |
| | 1,3-propanediol | do [2] | 96 |
| 53 | 1,3-butanediol | Clear | 93 |
| | 1,4-butanediol | Opaque [2] | 97 |
| | Neopentyl glycol | do [2] | 95 |
| | 1,6-hexanediol | Clear | 92 |
| | Ethylene glycol | Opaque [2] | 95 |
| | 1,3-butanediol | Clear | 92 |
| 65 | 1,6-hexanediol | Moderately clear | 95 |
| | 2-methyl-2-ethyl-1,3-propanediol | Clear | 85 |
| | 1,3-butanediol | Clear | 96 |
| 80 | 1,4-butanediol | Opaque [2] | 98 |
| | 1,3-butanediol | Clear | 98 |
| 100 | 1,4-butanediol | Opaque [2] | 99 |

[1] This polymer, though clear, is outside the invention because of its poor physical properties, thus demonstrating that 1,3-butanediol is a non-reinforcing diol.
[2] Outside the invention.

the 4,4'-methylenebis-(cyclohexyl isocyanate) and/or the particular low molecular weight glycol used are varied.

To prepare all of the polymers a mixture of 31.9 g. (0.12 mole) of 4,4'-methylenebis(cyclohexyl isocyanate), 39.6 g. (0.04 mole) of polytetramethyleneether glycol having a number average molecular weight OF 990, a weight of low molecular weight glycol corresponding to 0.08 mole and 0.01 g. of dibutyltin dilaurate is heated to 60°–80° C., degassed, poured into a mold heated to 100° C. and cured by heating at 100° C. for 2–16 hours.

The results obtained using 5 samples of 4,4'-methylenebis(cyclohexyl isocyanate) containing from 20–100 percent *trans-trans* isomer in combination with 8 different low molecular weight glycols are tabulated below. All of the polymers are colorless, but many are not optically clear as indicated in the "Cured Polymer Appearance" column.

EXAMPLE 5

A. A mixture of 104.8 parts of the 4,4'-methylenebis(cyclohexyl isocyanate) described in example 1, 127.0 parts of a 70/30 ethylene/propylene adipate polyester glycol having a number average molecular weight of about 1,270, 27.0 parts of 1,4-butanediol and 0.04 parts of dibutyltin dilaurate is heated to 60° C., degassed and poured into a polytetrafluoroethylene-coated mold preheated to 100° C. The material gels in less than 1 hour. The mold is placed in a 100° C. oven for 3 hours to cure the polymer. The resulting product is optically clear.

B. The procedure of part A is repeated with the exception that the 4,4'-methylenebis(cyclohexyl isocyanate) used has the composition described in example 3, part B. The resulting product (which is outside this invention) is opaque.

EXAMPLE 6

To a mixture of 1,336 grams of the 4,4'-methylenebis(cyclohexyl isocyanate) described in example 1, 2,000 grams of polytetramethyleneether glycol having a number average molecular weight of about 1,000 and 279 grams of 1,4-butanediol at room temperature is added 0.08 gram of dibutyltin dilaurate. The mixture is agitated and warmed to 70° C. at which temperature it is clear and reacts with sufficient rapidity to raise the temperature slightly. The mixture is degassed and poured into a 30×30×3.8 cm. mold heated to about 100° C. and cured for 16 hours at 100° C. The resulting cast block is colorless and optically clear. Sheets about 30×30×0.08 cm. are skived from the block for the preparation of glass laminates.

The sheets are conditioned to 23 percent relative humidity, laminated between 30×30×0.031 cm. plates of glass by placing the assembly between blotter cushions in a steamheated press at 175° C., maintaining a pressure of about 35 p.s.i. (2.46 kg./cm.²) for 6 minutes, increasing the pressure to 2,000 p.s.i. (140.5 kg./cm.²) for 4 minutes, and then cooling under pressure. The resulting "prepress" laminates are then autoclaved for 9 minutes at 135° C. and 225 p.s.i. (15.8 kg./cm.²) in an oil autoclave. The laminates are optically clear and colorless.

Laminates are conditioned to 0° F. (−18° C.), 73° F. (23° C.) and 120° F. (49° C.) and tested for penetration resistance and integrity by dropping a 5-pound (2.27 kg.) steel ball from various heights on the laminates supported in a horizontal frame (American Standards Association Code Z-26, Test No. 5–26. At 0° F. (−18° C.) the ball does not penetrate the laminate (i.e., it is stopped and supported by the fractured laminate) until it is dropped from a height of 18 feet (5.5 m.). At 73° F. (27° C.), a height of 18 feet (55 m.) is again required to penetrate the laminates. At 120° F. (49° C.) the ball must be dropped from 12 feet (3.7 m.) to penetrate the laminate. In these impact tests very little or no glass is detached from the laminates.

EXAMPLE 7

Thermoplastic polyurethane sheeting suitable for use as a safety glass interlayer is prepared directly from monomers by a reaction-extrusion technique. Two reactant streams are metered continuously to a 2-inch twin-screw extruder in a volume ratio of stream 1 to stream 2 of 3 to 5. The compositions of the streams are as follows:

Stream 1—Mixture of:
  1,590 g. Polytetramethyleneether glycol (MW 1,000)
  9,150 g. 4,4'-Methylenebis(cyclohexyl isocyanate) described in example 1.

Stream 2—Mixture of:
  15,260 g. Polytetramethyleneether glycol (MW 1,000)
  1,575 g. 1–4 Butanediol
  7.5 g. Dibutyltin Dilaurate The two streams are rapidly mixed within the extruder, polymerization is carried out between 150° and 180° C. in a zone of high mixing with a residence time of approximately 5 minutes. The product is then extruded through a film die into a water quench tank as 30-mil sheeting.

The product has the following physical properties:
Tensile at Break, p.s.i.—3,300
Elongation at Break, percent—490
Hardness, Shore D—29

The sheeting is optically clear and colorless. Glass laminates are prepared using the conditions of example 6. The laminates are haze-free, colorless, and contain no optical distortions. The laminates pass the ASA 5–26 five-pound ball drop test.

What is claimed is:

1. A substantially colorless, optically clear, thermoplastic polyurethane prepared by mixing simultaneously or consecutively in any order (A) 1.0 mole of a high molecular weight polyether glycol or polyester glycol melting below about 40° C. and having a molecular weight, M, where M has a value of about 500–3,000, (B) about 0.6M/1000–3.5M/1000 moles of a diol having a molecular weight of less than about 250, and (C) diisocyanato-dicyclohexylmethane, containing about 10–100 percent of *trans-trans* 4,4'-methylenebis(cyclohexyl isocyanate), in an amount substantially equivalent to the equivalents of (A)+(B); with the provisos that: (1) the mixture of polymer-forming ingredients is heated in the presence of a urethane-forming catalyst, promptly after mixing, to a temperature of about 50–210° C., and (2) when the diisocyanate contains not more than 30 percent *trans-trans* isomer, the diol is at least one of 1,4-butanediol, ethylene glycol, 1,2-propanediol, 1,3-propanediol, neopentyl glycol, cis or trans-1,4-dihydroxycyclohexane or 1,4-di(β-hydroxyethoxy)benzene, and when the diisocyanate contains more than 30 percent *trans-trans* isomer, the diol is at east one of 1,3-butanediol, 2-methyl-2-ethyl-1,3-propanediol, 2-methylbutanediol-1,4, 2-butyl-2-ethylpropanediol-1,3 or 2-allyloxymethyl-2-methylpropanediol-1,3.

2. A polyurethane of claim 1 wherein the isocyanate is 4,4'-methylenebis(cyclohexyl isocyanate) which is a liquid at 25° C. or less.

3. A polyurethane of claim 1 wherein the isocyanate contains about 20–30 percent *trans-trans* 4,4'-methylenebis(cyclohexyl isocyanate).

4. A polyurethane of claim 3 wherein the high molecular weight glycol has a molecular weight of about 600–2,000.

5. A polyurethane of claim 1 wherein the isocyanate is 4,4'-methylenebis(cyclohexyl isocyanate) which contains about 20–30 percent of the *trans-trans* isomer.

6. A polyurethane of claim 5 wherein the reinforcing diol is 1,4-butanediol.

7. A polyurethane of claim 6 wherein the reaction is carried out by a one-shot process.

8. A polyurethane of claim 6 wherein the high molecular weight glycol is polytetramethyleneether glycol having a number average molecular weight of 600–2,000

9. A polyurethane of claim 6 wherein the isocyanate contains about 20 percent of the *trans-trans* isomer, about 65 percent of the *cis-trans* isomer and about 15 percent of the *cis-cis* isomer of 4,4'-methylenebis(cyclohexyl isocyanate) and the high molecular weight glycol is polytetramethyleneether glycol having a molecular weight of about 1,000, said components being used in amounts such that there are from about 2.0–3.1 moles of the isocyanate and about 1.0–2.1 moles of 1,4-butanediol per mole of polytetramethyleneether glycol.

10. A laminated article consisting essentially of a layer of the polyurethane of claim 1 sandwiched between layers of transparent ceramic, glass or plastic.

11. A laminated article of claim 10 wherein the outer layers are glass.

* * * * *